United States Patent
Daw

(10) Patent No.: US 6,478,582 B1
(45) Date of Patent: Nov. 12, 2002

(54) FREE ROTATOR DEMONSTRATOR

(75) Inventor: Harold A. Daw, Las Cruces, NM (US)

(73) Assignee: New Mexico State Technology Transfer Corporation, Las Cruces, NM (US)

( * ) Notice: Subject to any disclaimer, the term of this patent is extended or adjusted under 35 U.S.C. 154(b) by 58 days.

(21) Appl. No.: 09/615,925

(22) Filed: Jul. 13, 2000

Related U.S. Application Data
(60) Provisional application No. 60/143,441, filed on Jul. 13, 1999.

(51) Int. Cl.$^7$ ................................................ G09B 23/08
(52) U.S. Cl. ........................................ 434/302; 434/300
(58) Field of Search ................................ 434/300, 301, 434/302, 186, 247, 249, 267, 276, 283; 273/63 A, 63 E; 264/162; 473/126

(56) References Cited

U.S. PATENT DOCUMENTS

| | | | |
|---|---|---|---|
| 2,074,363 A | | 3/1937 | Burke |
| 4,523,757 A | * | 6/1985 | Swett et al. ............... 273/63 E |
| 4,858,921 A | | 8/1989 | Eustice et al. |
| 5,011,144 A | | 4/1991 | Marello |
| 5,058,901 A | | 10/1991 | Salvino |
| 5,314,368 A | | 5/1994 | Cheng |
| 5,437,579 A | | 8/1995 | Salvino |
| 5,846,088 A | | 12/1998 | Reichert |

OTHER PUBLICATIONS

Daw, Harold A., Two Air–Supported Devices for Physics Laboratories and for Physics Demonstrations, Apr. 1965, American Journal of Physics, vol. 33, No. 4, pp. 322–326.*

Case, W.B., et al., "On the Interesting Behavior of a Gimbal–Mounted Gyroscope," *Am. J. Phys.*, vol. 60, No. 6, pp 503–506 (Jun. 1992).

Daw, H.A., "Two Air–Supported Devices for Physics Laboratories and for Physics Demonstrations," *J. Phys*, vol. 33, No. 4, pp 322–326 (.A.Apr. 1965).

de Lang, O.L., et al., "Measurement of Inertial and Noninertial Properties of an Air Suspension Gyroscope," *Am. J. Phys.*, vol61, No. 11, pp 974–981 (Nov. 1993).

Duane, B.H., "Air Suspension Gyroscope," *Calorimetric Determination of Absolute Temperature, Am. J. Phys.*, vol. 23, pp 147–155(1960).

Hart, J.B., et al. "Great Ellipsoids of Inertia and Space Physics," *Phys. Teach.*, vol. 6, pp 118–122.

Harter, W.G., et al., "Singular Motions of Asymmetric Rotators," *Am. J. Phys.*, vol. 44, No. 1 pp 1080–1083 (Nov. 1976).

Meiners, H.F., Physics Demonstration Experiments, *The Ronald Press Company, New York 1970*) pp. 266–267.

Soodak, H., et al., "Resolution Analysis of Gyroscopic Motion," *Am. J. Phys.*, vol. 62, No. 8, pp 687–694 (Aug. 1994).

Walstad, A., "The Hammer Flip," *Phys. Teacher*, vol. 28, pp 556–557 (Nov. 1990).

* cited by examiner

*Primary Examiner*—Derris H. Banks
*Assistant Examiner*—George F Hufnagel
(74) *Attorney, Agent, or Firm*—Stephen A. Slusher

(57) ABSTRACT

A spherical free rotator, supported on an air film within an air support. Different weight and density inserts may be positioned within cylindrical holes along diameters by the sphere, so that both symmetric and asymmetric rotation may be demonstrated.

20 Claims, 7 Drawing Sheets

FREE ROTATOR DEMONSTRATOR

CROSS-REFERENCE TO RELATED APPLICATIONS

This application claims the benefit of the filing of U.S. Provisional Patent Application Ser. No. 60/143,441, entitled Free Rotator Demonstrator, filed on Jul. 13, 1999, and the specification thereof is incorporated herein by reference.

BACKGROUND OF THE INVENTION

1. Field of the Invention (Technical Field)

The present invention relates to the art of teaching apparatus, and more particularly to a teaching apparatus for demonstration and experimentation with respect to moments of inertia and how they affect the spin axis, with application for use as a demonstration in mechanics classes and in mechanics experiments.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The free rotator is almost always discussed in college-level intermediate and advanced mechanics classes. The object of this discussion is to understand moments of inertia and how they affect the spin axis. The theory for the behavior of the axis of rotation is covered in physics textbooks, but a clear physical display of the phenomenon is lacking. The usual demonstration is to throw a box, a tennis racket, a hammer, a book, or similar objects in the air and observe the resulting rotation. Two references showing this procedure are found in *Physics Teacher.* John B. Hart: Great ellipsoids of inertia and space physics, *Phys Teach* 6:118–122 (1968); Allan Waistad: The hammer flip, *Phys Teach* 28:556–7 (1990). However, using an object such as the foregoing only allows a transient observation lasting about 1 second. In addition, generally speaking only the beginning and end conditions can be observed adequately. No meaningful experimentation can be conducted using objects such as the foregoing, given the difficulty of observation and measurement.

While many physics texts cover the theory of the free rotator, there has heretofore been no commercially available demonstrators of the free rotator. The reason for this is that most supports for the spinning rotator make it not truly free. William B. Case and Michael A. Shay: On the interesting behavior of a gimbal-mounted gyroscope, *Am J Phys* 60:503–6 (1992). A gyroscope made of a spherical ball floated in a hemispherical bowl using compressed air as the support mechanism has been described. Harold A. Daw: Two air supported devices for physics laboratories and for physics demonstrations, *Am J Phys* 33:322 (1965). The degree of interaction between the support and the rotating sphere is minimal. A number of uses have been made of the air supported bearing for gyroscopes. Robert G. Marclay: Air suspension gyroscope, *Am J Phys* 28:150 (1960); Bernard H. Duane: Air suspension gyroscope, *Am J Phys* 23:147 (1955); O. L. de Lange and J. Pierrus: Measurement of inertial and non inertial properties of an air suspension gyroscope, *Am J Phys* Vol. 61 pp. 974–81 (1993); and William G. Harter and Chong C. Kim: Singular motions of asymmetric rotators, *Am J Phys* 44:1080–3 (1976). However, a gyroscope has, by definition, a net off balance and therefore a torque. For demonstration of the free rotator, and for certain experiments, both symmetric and asymmetric rotators are desired, and additionally the degree of asymmetry should be variable for many demonstrations and experiments.

Certain balls, such as bowling balls, have been described with asymmetric weighting. See, for example, U.S. Pat. Nos. 4,523,757, 5,058,901 and 5,437,579. However, these are designed to be thrown or rolled, generally have weighting on the spin axis, have finger holes, cannot be used as symmetric rotators, are not marked to indicate the axis, and are not used with an air support film. Other prior art describes air support of balls, particularly of low-density balls, but does not disclose use of an air support film, which is essentially frictionless, as opposed to an air jet, and similarly does not teach uses with free rotators. See, for example, U.S. Pat. Nos. 2,074,363, 4,858,921, 5,011,144 and 5,314,368.

SUMMARY OF THE INVENTION

Disclosure of the Invention

The invention provides a free rotator apparatus, which apparatus includes a substantially homogeneous solid sphere with one or more cylindrical holes along a diameter of the sphere, a cylindrical insert of different density from the sphere disposed within each cylindrical hole, and a concave air support with curvature substantially matching that of the sphere. In this apparatus, there may be a single cylindrical hole traversing the diameter of the sphere, in which case the apparatus may be a symmetric rotator. In the apparatus, there may also be four cylindrical holes, each of a depth less than the radius of the sphere, with two holes lying along a first diameter and the remaining two holes lying along a second diameter at right angles to the first diameter. The apparatus with four cylindrical holes may be a symmetric rotator, or if the inserts within the holes along the first diameter have a different weight than the inserts within the holes along the second diameter, may be an asymmetric rotator.

In a preferred embodiment of the apparatus, the exterior surface of the insert has the same radius of curvature as the exterior surface of the sphere. The insert can include a threaded screw along the axis of the hole and disposed opposite the exterior, and the interior of the hole can then terminate in a threaded cylinder, such that the threaded screw may be threadably engaged with the threaded cylinder. The insert can further include two or more indentations on the exterior surface whereby rotational torque may be applied to the insert by means of a suitable tool. In another embodiment, the insert further includes a threaded cylinder disposed within the exterior surface of the insert, whereby a screw may be threadably engaged with the threaded cylinder to facilitate removal of the insert from the cylindrical hole. The yet another embodiment, the insert may be retained within the cylindrical hole by friction.

The apparatus can further include a source of pressurized gas in connection with the concave air support. The pressurized gas can be compressed air. The concave air support can include one or more holes, most preferably at the base thereof, for entry of pressurized gas. In this apparatus, the sphere may rotate freely within the concave air support, and is supported within the concave air support on an air film, and preferably a thin air film. The apparatus may further be provided such that the instantaneous spin axis can be directly recorded on the surface of the sphere.

The invention also includes a method for demonstrating the path of the spin axis of a free rotator, including the steps of providing a substantially homogeneous solid sphere with one or more cylindrical holes along a diameter of the sphere and a cylindrical insert of different density from the sphere disposed within each cylindrical hole, providing a concave air support with curvature substantially matching that of the sphere and a source of pressurized gas, spinning the sphere within the concave air support, and at two or more spaced intervals marking the spin axis on the surface of the sphere.

A primary object of the present invention is to provide an apparatus and method for demonstrating and recording the path of the spin axis for both symmetric and asymmetric rotators.

Another object of the present invention is to provide a spherical rotator on an essentially frictionless air bed.

Yet another object of the present invention is to provide an asymmetric rotator wherein the degree of asymmetry may be adjusted.

Another advantage of the present invention is that it permits experimentations on asymmetric rotators, by altering the amount of asymmetry.

Yet another advantage of the present invention is that the rotators may be rotated about any axis, as there is no interference from the support.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
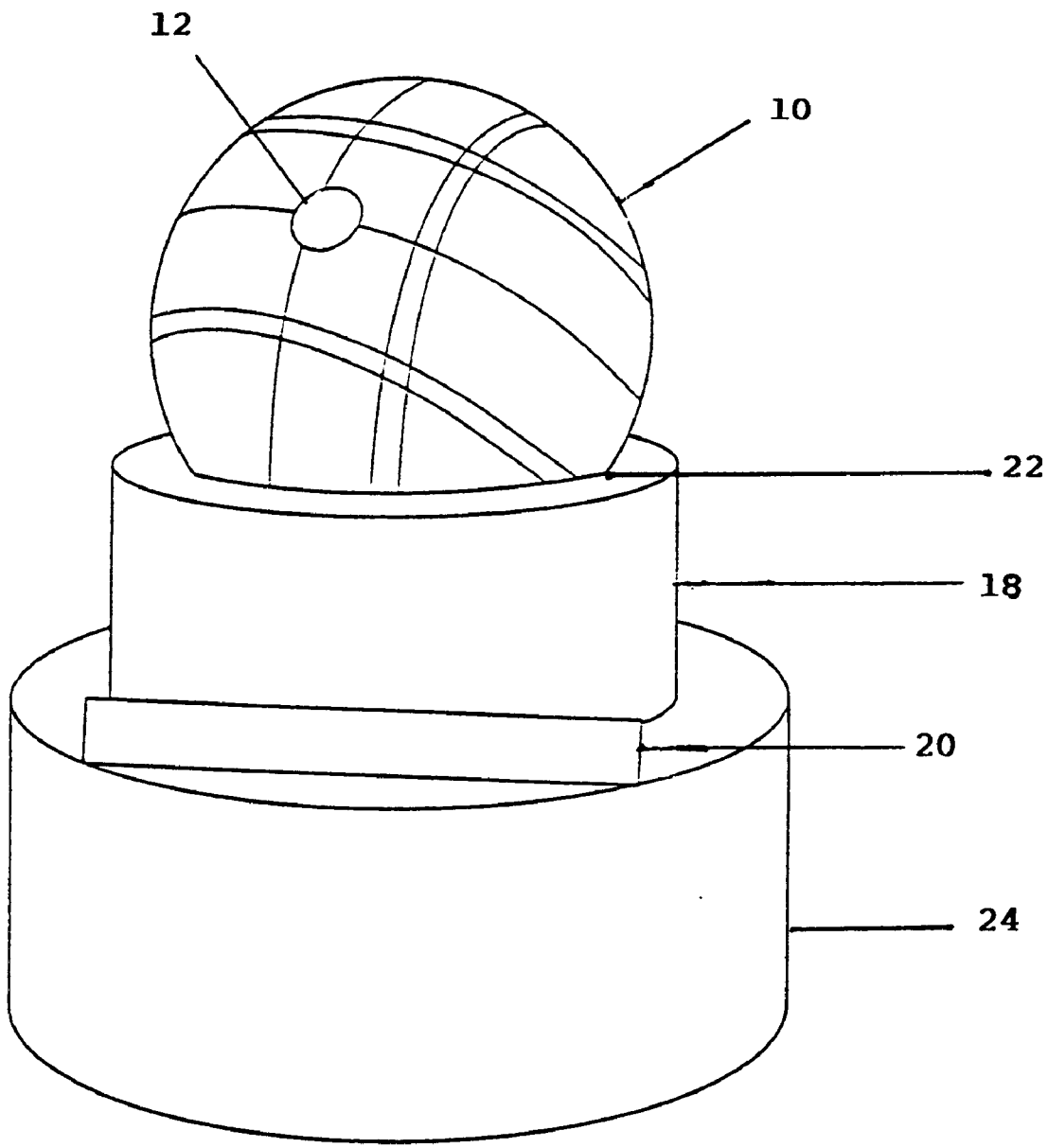
FIG. 1 is a Bocce ball on an air bearing. An aluminum rod, similar to the one shown sitting on the air-bearing seat, has been inserted on a diameter. This is a symmetric rotator.

FIG. 1 discloses a sphere 10, which may be a bocce ball as obtained from a sporting goods store. Alternatively, sphere 10 is any sphere of any solid, homogeneous material, which may be altered and modified as hereafter described. In the preferred embodiment wherein sphere 10 is a bocce ball, it has the dimensions and mechanical characteristics given in Table 1. Sphere 10 includes a cylindrical hole 12 along a diameter of sphere 10. In the embodiment in which a bocce ball is used, the cylindrical hole 12 may have a diameter of 1.43 cm. A rod, such as aluminum rod 20, is inserted in hole 12. The sphere 10 rests within an air bearing or air support film apparatus 18, which includes a concave cavity 22 within which the sphere 10 rests. The design, fabrication and use of an air bearing or air support film apparatus suitable for use in this invention is generally described in Harold A. Daw: Two air supported devices for physics laboratories and for physics demonstrations, *Am J Phys* 33:322 (1965), which is incorporated herein by reference. Preferably, the cavity 22 is machined to form a spherical concavity to fit the sphere 10. Most preferably, the spherical concavity is machined to within a few thousandths of an inch larger than the diameter of the sphere 10, so that a very dose fit is obtained, thereby minimizing the volume and pressure of air or gas required to float the sphere 10 on a thin film of air or gas. At the base of cavity 22 are one or more air entry holes, connected by tubing to a source of compressed air, compressed gas, or other constant air pressure supply. The apparatus 18 rests on base 24, which base 24 may optionally include an air or gas cylinder, control valve and the like. In operation, the flow of compressed air or gas into cavity 22 is increased until sphere 10 is floating on a thin film of air or gas, and may be freely rotated without touching or contacting the surface of cavity 22.

Figure 2:
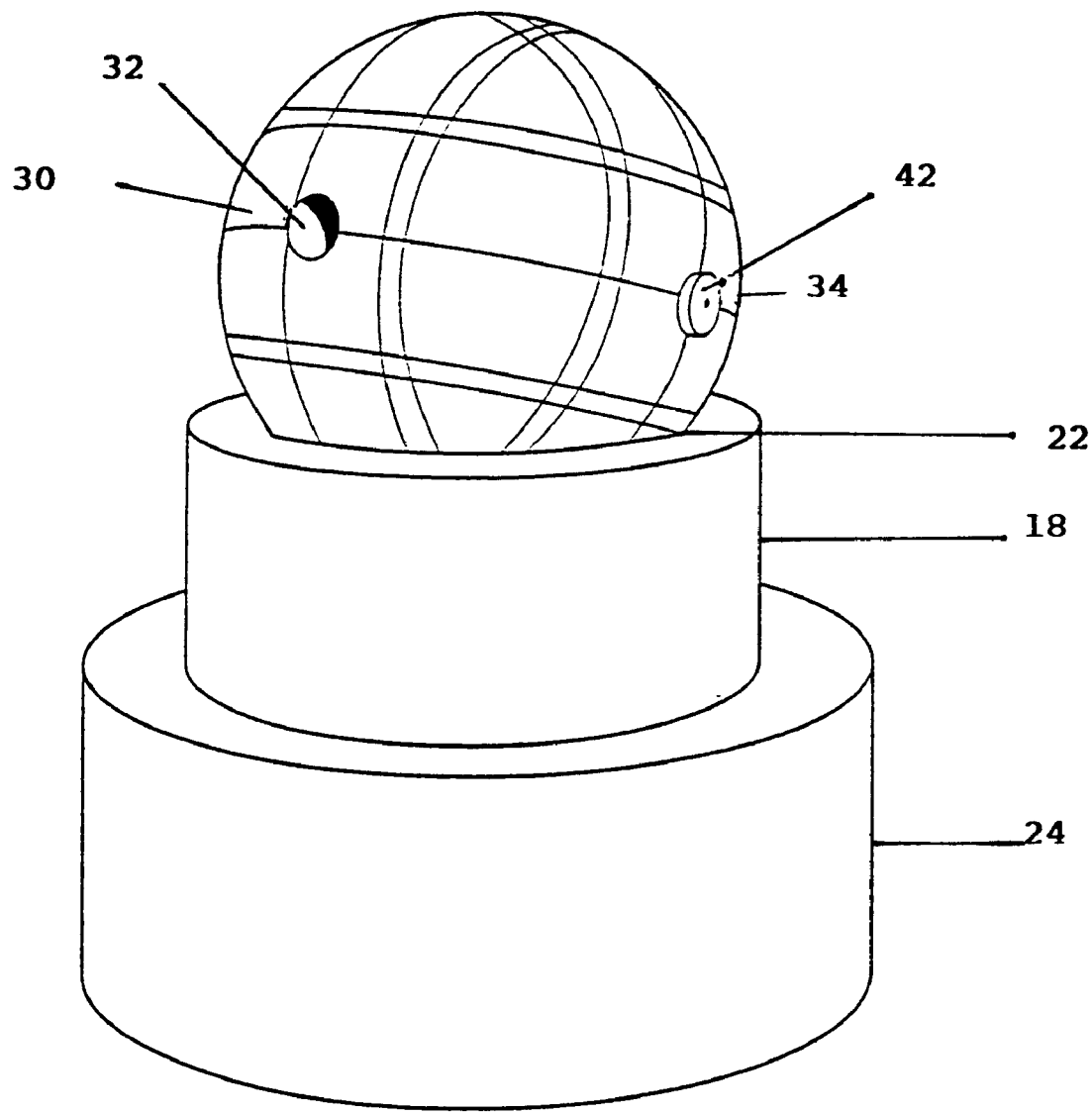
FIG. 2 is a Bocce ball on an air bearing showing construction. Two aluminum inserts are inserted on a diameter and two brass inserts are inserted on a perpendicular diameter. Only a brass insert is shown. The inserts have a threaded hole to assist in changing them. This is an asymmetric rotator.

FIG. 2 discloses a sphere 30, which may be a bocce ball as obtained from a sporting goods store. Alternatively, sphere 30 is any sphere of any solid, homogeneous material, which may be altered and modified as hereafter described. In the preferred embodiment wherein sphere 30 is a bocce ball, it has the dimensions and mechanical characteristics given in Table 1. Sphere 30 includes four cylindrical holes, hole 32, together with a hole on the opposite side, along a diameter of sphere 30, and hole 34, together with a hole on the opposite side, along a diameter of sphere 30 at right angles to the diameter of hole 32. Each of holes 32 and 34 are a set diameter, such as one-half inch, and a set depth, such as 1 inch. Depicted in hole 34 is an insert 42; the inserts are held within the holes by friction. The sphere 30 rests within an air bearing or air support film apparatus 18, which includes a concave cavity 22 within which the sphere 10 rests. At the base of cavity 22 are one or more air entry holes, connected by tubing to a source of compressed air, compressed gas, or other constant air pressure supply. The apparatus 18 rests on base 24, which base 24 may optionally include an air cavity, leveling screws and the like. In operation, the flow of compressed air or gas into cavity 22 is increased until sphere 30 is floating on a thin film of air or gas, and may be freely rotated without touching or contacting the surface of cavity 22.

Figure 3:
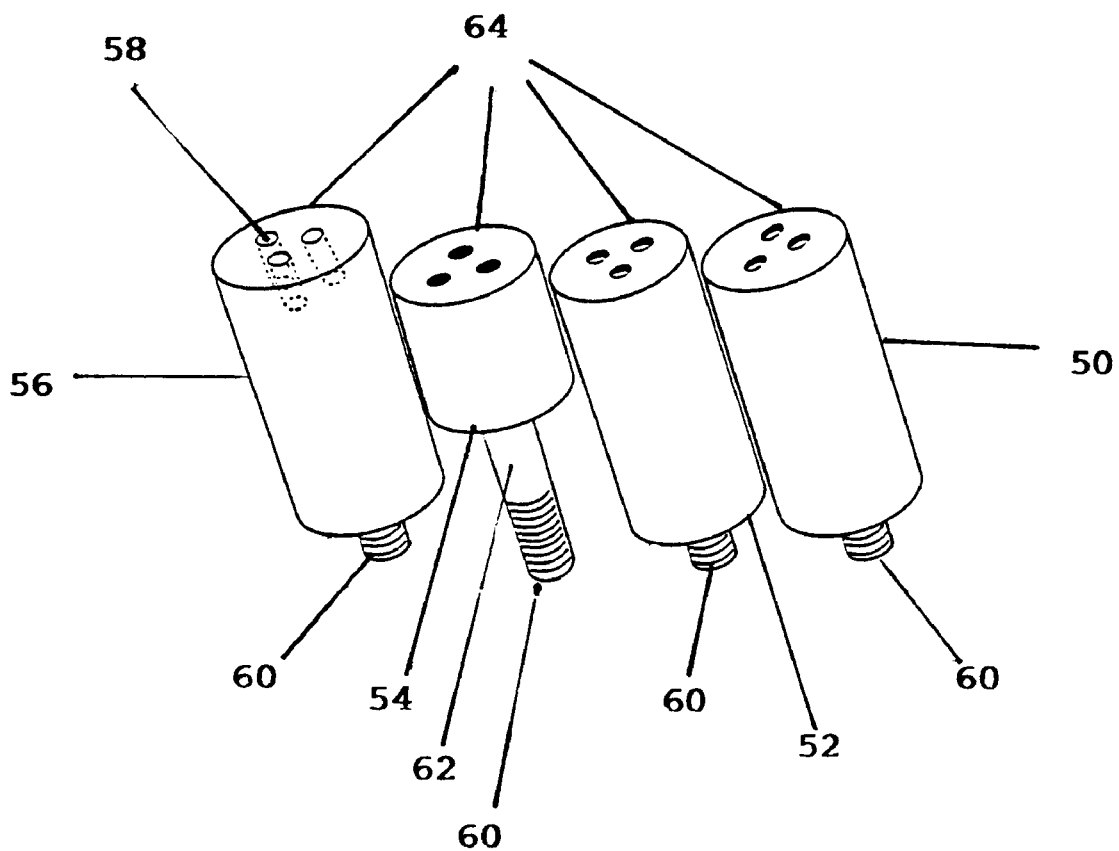
FIG. 3 depicts brass, aluminum (two sizes) and lexan inserts for the large sphere of FIG. 4. The threaded portions hold the insert in the sphere. The faces match the sphere contour and three blind holes are provided for use with a wrench in adjusting or changing the inserts.

FIG. 3 discloses four different inserts 64 for sphere 70. Insert body 50 is a brass metal insert, forming a cylindrical shape so as to tightly fit within holes 74. Insert bodies 52 and 54 are each aluminum inserts, with the cylindrical portion of different length, with shaft 62 shown attached to insert body 54. Insert body 56 is a lexan insert. Each insert contains a threaded screw 60 which may be engaged with threaded the holes in cylindrical holes 74 so as to engage the insert. The outer face of each of inserts 50, 52, 54 and 56 is machined so as to match the curvature of the surface of sphere 70. Three holes 58 are drilled into the exterior surface of any of inserts 50, 52, 54 or 56, forming indentations which may be utilized with a custom wrench for applying rotational torque to the insert, to facilitate insertion and removal.

Figure 4:
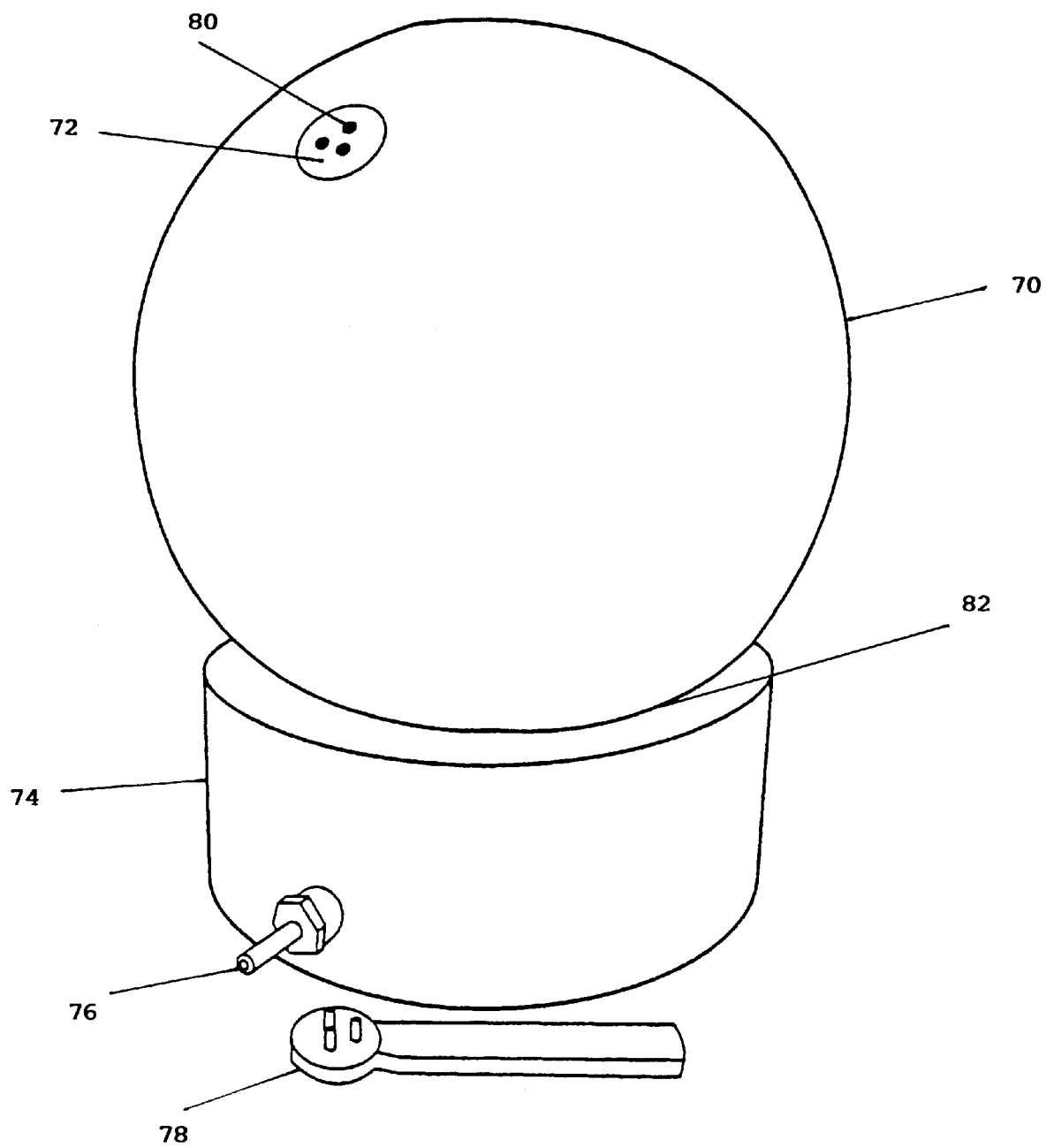
FIG. 4 is a large sphere with one aluminum plug visible. The wrench is shown at the bottom. The air bearing is visible as is the air inlet.

FIG. 4 discloses a sphere 70, which is a large urethane ball with a diameter of 21.79 cm, with the dimensions and mechanical characteristics given in Table 1. Alternatively, sphere 70 is any sphere of any solid, homogeneous material, which may be altered and modified as hereafter described. Sphere 70 includes four cylindrical holes, with hole 72 depicted containing insert 80. Not shown is a hole on the opposite side of hole 72, along a diameter of sphere 70, and holes along a diameter of sphere 70 at right angles to the diameter of hole 72. Each of the holes is a set diameter, such as one inch, and a set depth, such as 2 inches. The interior of each of the cylindrical holes terminate in a smaller diameter tapped threaded hole. Depicted in hole 72 is an insert 80. The sphere 70 rests within an air bearing or air support film apparatus 74, which includes a concave cavity 82 within which the sphere 70 rests. Preferably, the cavity 82 is machined to form a spherical concavity to fit the sphere 70. Most preferably, the spherical concavity is machined to within a few thousandths of an inch larger than the diameter of the sphere 70, so that a very close fit is obtained, thereby minimizing the volume and pressure of air or gas required to float the sphere 70 on a thin film of air or gas. In this and other embodiments, the machining may be by lapping, thereby assuring a suitably tight fit. At the base of cavity 82 are one or more air entry holes, connected by tubing to a source of compressed air, compressed gas, or other constant air pressure supply through connector 76. In operation, the flow of compressed air or gas through connector 76 into cavity 82 is increased until sphere 70 is floating on a thin film of air or gas, and may be freely rotated without touching or contacting the surface of cavity 82. Also depicted is wrench 78, which is used to insert and remove insert 80 and the inserts of FIG. 3.

Figure 5:
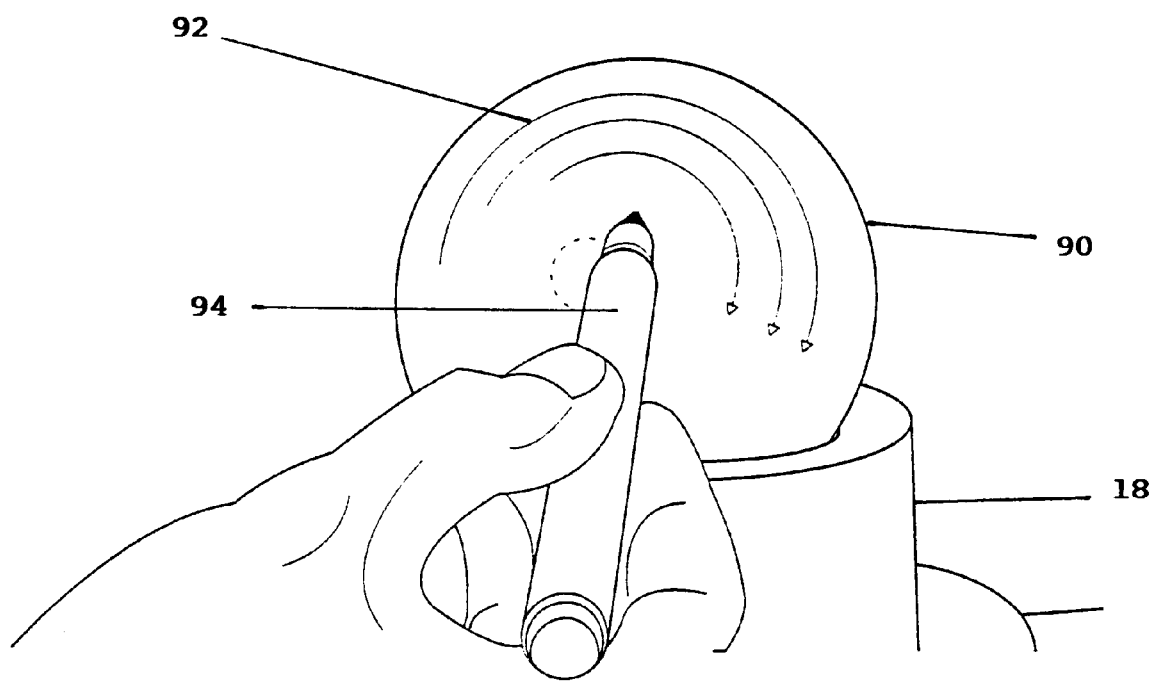
FIG. 5 depicts a spinning sphere on the air-bearing seat and a water-soluble marker used to mark the spin axis.

FIG. 5 discloses a spinning sphere 90, which is similar to sphere 10, resting within an air bearing or air support film apparatus 18. By use of a marker 94 the axis of rotation 92 is marked on sphere 90.

Figure 6:
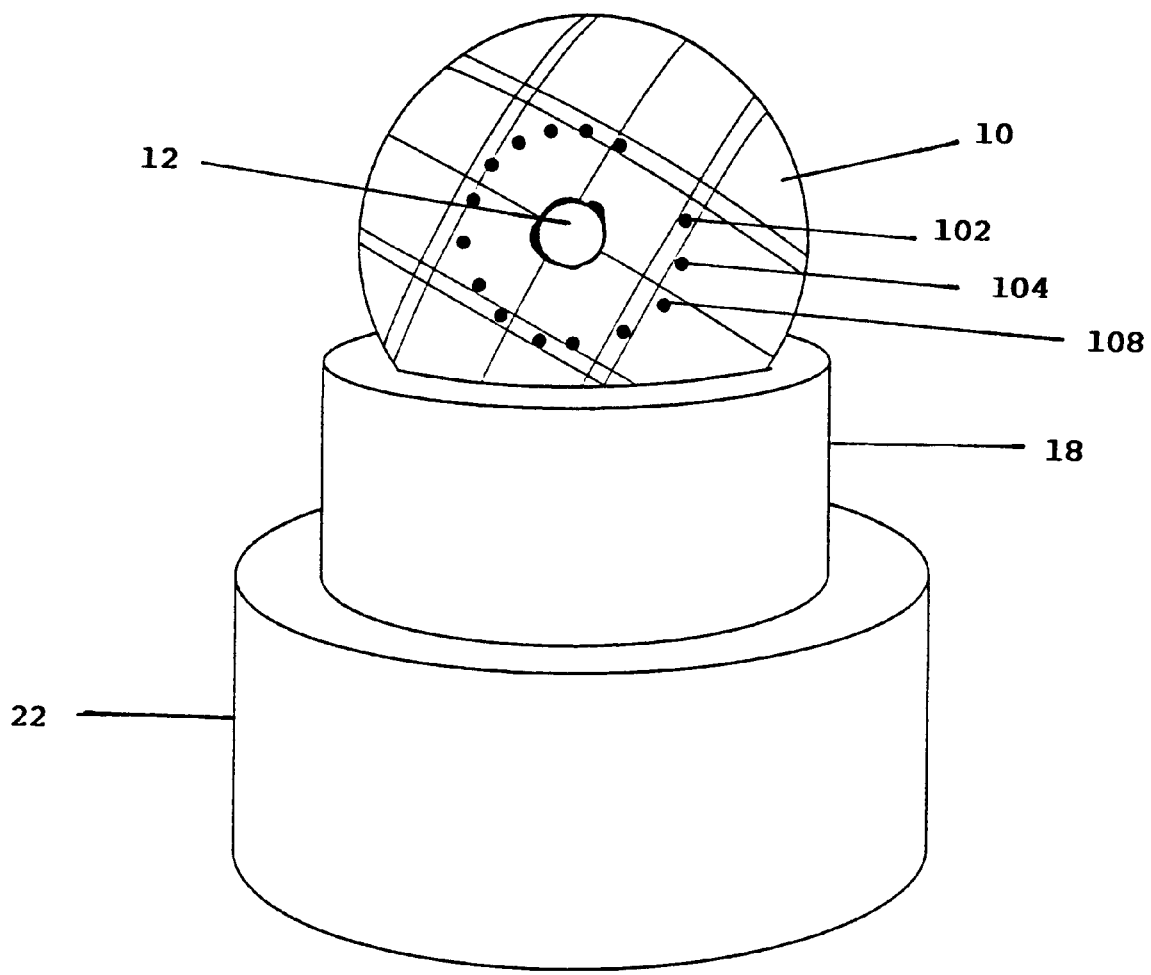
FIG. 6 depicts the path of the instantaneous spin axis on a symmetric sp here.

FIG. 6 discloses symmetric rotator sphere 10 that has been rotated. Marked on sphere 10 are timed markings of the path of instantaneous rotation axis 102, 104 and 108.

Figure 7:
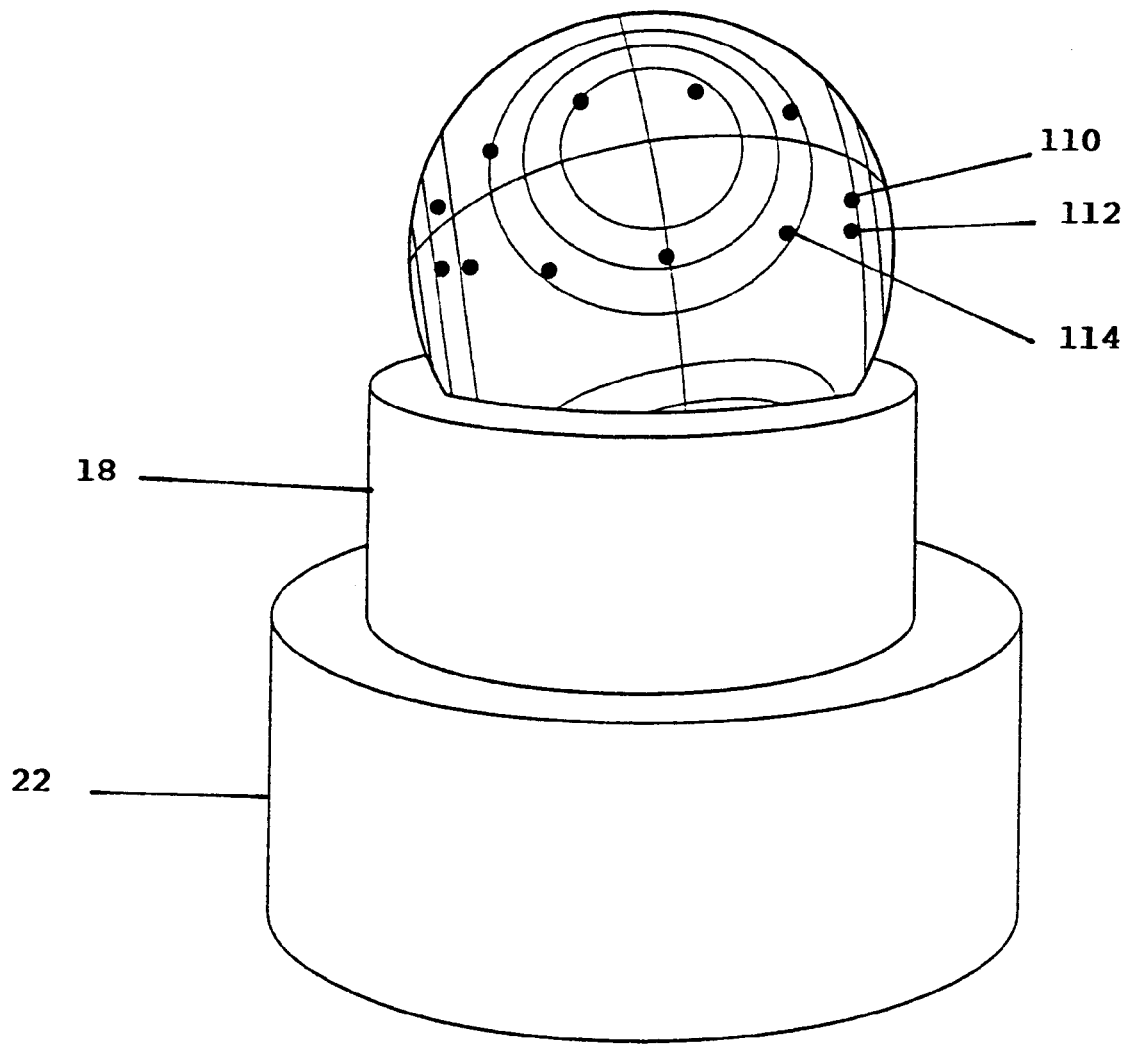
FIG. 7 depicts the path of the instantaneous spin axis on the asymmetric rotator. The aluminum plugs are to the right and the left but do not show. The brass plugs do not show. The sphere was initially spun with the axis of rotation near one of the aluminum plugs. The inversion is clearly shown.

FIG. 7 discloses asymmetric rotator sphere 30 that has been rotated. Marked on sphere 30 are timed markings of the path of instantaneous rotation axis 110, 112 and 114, clearly showing inversion.

The rotator apparatus described here provides a means of clearly demonstrating the behavior of the instantaneous spin axis in a body centered system over an extended period. The actual path of the spin axis is plotted. The spherical ball is supported on a thin film of air and the friction on the rotating spherical ball is very low allowing the motion to be virtually friction free. The sphere can have up to three different moments of inertia.

The theory of the free rotator behavior is well covered in a number of texts. The following is a brief outline of the theory, adapted from Herbert Goldstein: *Classical Mechanics* (Addison Wesley Publishing Company, London, 1956), pp. 156–63.

The equations of motion for the rigid rotator are $$L = E_i m_i r_i \times v_i = E_i m_i r_i \times (\omega \times r_i) = E_i m[(r_i \cdot r_i)\omega - r_i(r_i \cdot \omega)] = II \cdot \omega, \quad \text{(Eq. 1)}$$

where

L=angular momentum vector, $\omega$=angular velocity, and II is the inertia tensor.

$$II = E_i m_i (r_i^2 I - r_i r_i) \quad \text{(Eq. 2)}$$

N=torque $$N = dL/dt = dII \cdot \omega/dt \quad \text{(Eq. 3)}$$

If one changes to a system anchored in the body, then $$N = d'II \cdot \omega/dt + \omega \times II \cdot \omega = II \cdot d\omega/dt + \omega \times II \cdot \omega. \quad \text{(Eq. 4)}$$

where the time derivative in the body frame is designated by d'/dt.

which are Euler's equations for the rigid body.

In Eqs. 5(a)–5(c), $\omega_1$, $\omega_2$, and $\omega_3$ are the components of the rotation vector in the body system. The $I_i$ (i=1,2,3) are the principal moments of inertia.

If there is no torque (the free asymmetric rotator), then N is zero, and Eqs. 5(a)–5(c) become $$I_1 \dot{\omega}_1 + (I_3 - I_2)\omega_3 \omega_2 = 0 \quad \text{(Eq. 6a)}$$

$$I_2 \dot{\omega}_2 + (I_1 - I_3)\omega_3 \omega_1 = 0 \quad \text{(Eq. 6b)}$$

$$I_3 \dot{\omega}_3 + (I_2 - I_1)\omega_2 \omega_1 = 0 \quad \text{(Eq. 6c)}$$

For the free symmetric rotator, $I_1 = I_2$, and Eqs. 6(a)–6(c) become $$I_1 \dot{\omega}_1 = (I_1 - I_3)\omega_3 \omega_2 \quad \text{(Eq. 7a)}$$

$$I_1 \dot{\omega}_2 = (I_1 - I_3)\omega_3 \omega_1 \quad \text{(Eq. 7b)}$$

$$I_3 \dot{\omega}_3 = 0. \quad \text{(Eq. 7c)}$$

Since by Eq. 7(c) $I_3 \dot{\omega}_3 = 0$, $\omega_3$ is constant. Energy is also conserved and therefore:

$$\tfrac{1}{2} I_1 \omega_1^2 + \tfrac{1}{2} I_1 \omega_2^2 = E - \tfrac{1}{2} I_3 \omega_3^2 \quad \text{(Eq. 8)}$$

is constant and the instantaneous axis traces out a circle on the surface of the sphere. The radius of the circle is given by $$r = R \sin(\alpha) \quad \text{(Eq. 9)}$$

where R is the radius of the sphere and $$\sin(\alpha) = (\omega_1^2 \omega_2^2)^{1/2} / (\omega_1^2 + \omega_2^2 + \omega_3^2)^{1/2}. \quad \text{(Eq. 10)}$$

The magnitude of the spin vector is set by the hand spin, and the direction of the spin vector relative to the symmetry axis is set by the initial spin direction.

The precession rate of the angular velocity vector about the symmetry axis is given by $$\Omega = \omega_3 (I_3 - I_1)/I_1. \quad \text{(Eq. 11)}$$

In demonstrations the rate of precession and the rate of rotation can be measured. The path of the angular velocity is plotted directly on the surface of the rotating sphere.

The path of the spin axis for the asymmetric rotator is much more complicated. The paths are given in terms of the polhode, the path of the angular momentum vector on the inertia ellipsoid, and the herpolhode, the path of the angular momentum vector on the invariable plane, etc. Using this free rotator apparatus the path is plotted directly on the surface of a sphere, the ball, and not on the inertia ellipsoid. Nevertheless, all of the aspects of asymmetric rotators can be illustrated: stable precession about the larger and smaller moments of inertia, and inversion if set in rotation about the intermediate axis. Other settings result in a variety of interesting paths.

The free rotator apparatus consists of three spheres. One is a 11.19 cm diameter bocce ball with an aluminum rod 1.43 cm in diameter inserted along a diameter of the sphere. This sphere is a symmetric rotator (see FIG. 1).

A second bocce ball has four holes drilled into it, ½ in. in diameter and 1 in. deep, 90° apart on a circumference. Metal inserts are slid into these holes to allow one to set the relative magnitudes of the three principal moments of inertia. In this case two aluminum inserts are inserted 180° apart, and two brass inserts are inserted in the remaining two holes. The inserts are held by friction. The ends of the inserts are machined to match the curvature of the sphere surface. Threaded holes, such as 4–40 screws, may be tapped in each plug to facilitate removal of the plugs. This sphere is used as the asymmetrical free rotator (see FIG. 2).

A third sphere is the size of a bowling ball, 21.79 cm diameter, shown in FIG. 4. While the smaller spheres are quite adequate for small class demonstrations, the larger sphere is much better for larger classes.

For sphere 70 the holes in the sphere are drilled with a tapped hole in the bottom. The inserts 50, 52, 54 and 56 are inserted and then screwed into the tapped holes. This allows inserts of a variety of configurations such that the sphere may be used as a balanced sphere, i.e., the density of the inserts match the density of the sphere; as a symmetric sphere, i.e., two of the inserts do not match the density of the sphere; and as an asymmetric sphere, i.e., there are two sets of inserts which do not match and have a different density than the sphere. See Table 1 and Table 2. It is also possible to prepare inserts containing liquid materials. It is also possible to arrange the inserts such that there is a net off balance and therefore a torque on the sphere. The sphere will then behave as a gyroscope with complete freedom for the axis of rotation as the support does not interfere. See FIG. 3 for typical construction of the inserts. Note that three holes 58 have been drilled into the outer surfaces of these inserts. These holes are used with a suitable wrench 78 to change the inserts. The large sphere 70 is essentially magnified version of the smaller sphere 30, with inserts now measuring 1 inch in diameter and 1 or 2 inches in length (see FIG. 4).

TABLE 1

Mechanical Characteristics of Spheres

|  | Sphere 10 or 30 | Sphere 70 |
|---|---|---|
| Diameter (cm) | 11.19 | 21.79 |
| Ball mass (g) | 1,287 | 6,690 |
| Volume (cm$^3$) | 733.3 | 5421 |
| Density (g/cm$^3$) | 1.753 | 1.234 |
| Moment of inertia (g cm$^2$) | 16,120 | 317,900 |

TABLE 2

Rod and Insert Data

|  |  | length (cm) | diameter (cm) | mass (g) | density (g/cm$^3$) | volume (cm$^3$) |
|---|---|---|---|---|---|---|
| | Sphere 10 or 30 | | | | | |
| 20 | rod | 11.2 | 1.43 | 48.8 | 2.69 | 18.0 |
| | brass insert | 2.54 | 1.27 | 26.8 | 8.33 | 3.22 |
| | aluminum insert | 2.54 | 1.27 | 8.5 | 2.64 | 3.22 |
| | Sphere 70 | | | | | |
| 50 | large brass | 5.08 | 2.54 | 220.1 | 8.34 | 26.4 |
| 52 | large aluminum | 5.08 | 2.54 | 70.3 | 2.66 | 26.4 |
| 54 | intermediate aluminum | 2.54 | 2.54 | 39.9 | 2.64 | 15.1 |
| 56 | lexan | 5.08 | 2.54 | 30.9 | 1.17 | 26.4 |

Based on the dimensions and measures of the spheres and inserts, the principal moments of insertion, I, $I_2$ and $I_3$, can be calculated. Given in Table 3 are the results obtained based on the dimensions and measures given in Table 1 and 2.

TABLE 3

Moments of Inertia of the spheres in units of g cm$^2$.

|  | Symmetric Sphere 10 | Asymmetric Sphere 30 with brass and aluminum insert | Sphere 70 with inserts 50 and 56 (symmetric rotator) | Sphere 70 with inserts 50 and 52 (asymmetric rotator) | Sphere 70 with inserts 52 and 54 (asymmetric rotator) |
|---|---|---|---|---|---|
| $I_1$ | 16,300 | 16,230 | 318,500 | 323,634 | 321,800 |
| $I_2$ | 16,120 | 16,940 | 344,800 | 344,800 | 323,400 |
| $I_3$ |  | 17,050 | 345,100 | 350,200 | 327,184 |

This apparatus can be used to make a dear presentation of the motion of a symmetric free rotator, and an asymmetric free rotator. Using a variety of interchangeable inserts or plugs, one can demonstrate a wide variety of rotational phenomenon, including that of gyroscopic motion.

EXAMPLE 1

Demonstration: The Symmetric Rotator

Spin the sphere as shown in FIG. 1. The sphere is spun so that the axis of rotation faces the class. Mark the sphere as shown in FIG. 5. The sphere is marked about every 1 or 2 seconds for about one minute, with the time adjusted with the spin rate such that an adequate number of points are marked to clearly show the path. To quantify the results, the spin rate, the precession rate, and the radius of the circular path of the angular momentum vector are measured. The formulas given can be used to see that they are consistent with the results. FIG. 6 shows such a marked sphere. With the choices made in using the apparatus, the value of $(I_1-I_3)/I_1$ is about $1.125 \times 10^{-2}$ for the small symmetric rotator. This means that for spin rates for the sphere in the vicinity of 2 rev/sec, the precession rate is on the order of 1.35 revolutions per minute.

EXAMPLE 2

Demonstration: The Asymmetric Rotator

This procedure is the same as for the symmetric rotator. On rotating the sphere about an axis close to the axis of the larger moment of inertia, or about an axis close to the axis of the smaller moment of inertia, near circular paths similar to the symmetric rotator are obtained. On rotating about an axis close to the axis of the intermediate moment of inertia, the rotator will flip completely over. The paths are not circles, and the simple formulas above, Equs. 7–11, do not apply. Axes of rotation that are some distance from the symmetry axis will result in a variety of path shapes. FIG. 7 shows a typical path. This is for an initial spin about the intermediate axis and shows a reversal in the axis of rotation.

EXAMPLE 3

Laboratory Experiment—Symmetric Rotator

The sphere is spun and a plot made of the decay curve of the spin rate. The sphere is spun again, and the following is done:

1. Use a marker to mark the spin axis of the sphere at about 1 to 2 second intervals for about ½ minute as shown in FIG. 5.

2. Time the interval during which the marks are made.

3. Measure the rate of spin by counting about twenty revolutions of the axis and measuring the time at the beginning of the marking, and repeat toward the end of the marking cycle.

The precession rate, the spin rate, and the radius of the circle of precession are calculated. The time for a full revolution is estimated if only a part of a revolution has been marked. The angle between the body axis and the precession path is measured. The average spin rate is determined from the spin rates measured and the decay curve. The results are compared with those given by Eq. 11.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A free rotator apparatus, comprising:
   a. A substantially homogeneous solid sphere;
   b. One or more cylindrical holes along a diameter of the sphere;
   c. A non-magnetic cylindrical insert of different density from the sphere disposed within each cylindrical hole;
   d. A concave air support with curvature substantially matching that of the sphere.

2. The apparatus of claim 1, wherein there is a single cylindrical hole traversing the diameter of the sphere.

3. The apparatus of claim 2 which is a symmetric rotator.

4. The apparatus of claim 1, wherein there are four cylindrical holes, each of a depth less than the radius of the sphere, two holes lying along a first diameter and the remaining two holes lying along a second diameter at right angles to the said first diameter.

5. The apparatus of claim 4 which is a symmetric rotator.

6. The apparatus of claim 4 wherein the inserts within the holes along the first diameter have a different weight than the inserts within the holes along the second diameter.

7. The apparatus of claim 6 which is an asymmetric rotator.

8. The apparatus of claim 1, wherein the exterior surface of each one or more insert has the same radius of curvature as the exterior surface of the sphere.

9. The apparatus of claim 1, wherein each one or more insert further comprises a threaded screw along the axis of the hole and disposed opposite the exterior, and wherein the interior of the hole terminates in a threaded cylinder, whereby the threaded screw may be threadably engaged with the threaded cylinder.

10. The apparatus of claim 9, wherein each one or more insert further comprises two or more indentations on the exterior surface whereby rotational torque may be applied to said insert by means of a suitable tool.

11. The apparatus of claim 1, wherein each one or more insert further comprises a threaded cylinder disposed within the exterior surface of the insert, whereby a screw may be threadably engaged with such threaded cylinder to facilitate removal of the insert from the cylindrical hole.

12. The apparatus of claim 1 wherein each one or more insert is retained within the cylindrical hole by friction.

13. The apparatus of claim 1, further comprising a source of pressurized gas in connection with the concave air support.

14. The apparatus of claim 13, wherein the pressurized gas is compressed air.

15. The apparatus of claim 1, wherein the concave air support further comprises one or more holes for entry of pressurized gas.

16. The apparatus of claim 1, wherein the sphere may rotate freely within the concave air support.

17. The apparatus of claim 16, wherein the sphere is supported within the concave air support on an air film.

18. The apparatus of claim 17, wherein the air film is a thin air film.

19. A free rotator apparatus, comprising:
   a. A substantially homogeneous solid sphere;
   b. One or more cylindrical holes along a diameter of the sphere;
   c. A cylindrical insert of different density from the sphere disposed within each cylindrical hole; and
   d. A concave air support with curvature substantially matching that of the sphere;
   wherein the instantaneous spin axis is directly recorded on the surface of the sphere.

20. A method for demonstrating the path of the spin axis of a free rotator, comprising the steps of:
   a. providing a substantially homogeneous solid sphere with one or more cylindrical holes along a diameter of the sphere and a cylindrical insert of different density from the sphere disposed within each cylindrical hole;
   b. providing a concave air support with curvature substantially matching that of the sphere and a source of pressurized gas;
   c. spinning the sphere within the concave air support; and,
   d. at two or more spaced intervals marking the spin axis on the surface of the sphere.

* * * * *

UNITED STATES PATENT AND TRADEMARK OFFICE
CERTIFICATE OF CORRECTION

PATENT NO.     : 6,478,582 B1                                         Page 1 of 1
DATED          : November 12, 2002
INVENTOR(S)    : Harold A. Daw It is certified that error appears in the above-identified patent and that said Letters Patent is hereby corrected as shown below:

<u>Title page,</u>
Item [73], should read as follows:

-- [73]  Assignee:  New Mexico University Technology Transfer Corporation
                    Las Cruces, NM (US) --

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,478,582 B1
DATED         : November 12, 2002
INVENTOR(S)   : Harold A. Daw It is certified that error appears in the above-identified patent and that said Letters Patent is hereby corrected as shown below:

<u>Title page,</u>
Item [73], should read as follows:

-- [73]  Assignee:  New Mexico State University Technology Transfer Corporation
                    Las Cruces, NM (US) --

This certificate supersedes Certificate of Correction issued August 12, 2003.

Signed and Sealed this

Sixteenth Day of December, 2003

JAMES E. ROGAN
*Director of the United States Patent and Trademark Office*